US010620844B2

(12) United States Patent
Katiyar

(10) Patent No.: US 10,620,844 B2
(45) Date of Patent: Apr. 14, 2020

(54) SYSTEM AND METHOD TO READ CACHE DATA ON HYBRID AGGREGATES BASED ON PHYSICAL CONTEXT OF THE DATA

(71) Applicant: NETAPP, INC., Sunnyvale, CA (US)

(72) Inventor: Manish Katiyar, Santa Clara, CA (US)

(73) Assignee: NETAPP, INC., Sunnyvale, CA (US)

( * ) Notice: Subject to any disclaimer, the term of this patent is extended or adjusted under 35 U.S.C. 154(b) by 55 days.

(21) Appl. No.: 16/138,614

(22) Filed: Sep. 21, 2018

(65) Prior Publication Data

US 2019/0026032 A1    Jan. 24, 2019

Related U.S. Application Data

(63) Continuation of application No. 14/831,103, filed on Aug. 20, 2015, now abandoned.

(51) Int. Cl.
*G06F 3/06* (2006.01)
(52) U.S. Cl.
CPC .......... *G06F 3/0611* (2013.01); *G06F 3/0665* (2013.01); *G06F 3/0685* (2013.01)
(58) Field of Classification Search
CPC ..... G06F 3/0611; G06F 3/0665; G06F 3/0685
See application file for complete search history.

(56) References Cited

U.S. PATENT DOCUMENTS

| 2014/0244892 | A1 | 8/2014 | Goss et al. |
| 2015/0331806 | A1 | 11/2015 | Mondal et al. |
| 2016/0041904 | A1* | 2/2016 | Bhattacharya ...... G06F 16/1847 711/103 |
| 2016/0092488 | A1 | 3/2016 | Sun et al. |
| 2016/0239222 | A1 | 8/2016 | Shetty et al. |

* cited by examiner

*Primary Examiner* — Ryan Bertram
(74) *Attorney, Agent, or Firm* — Klein, O'Neill & Singh, LLP

(57) ABSTRACT

Presented herein are methods, non-transitory computer readable media, and devices for writing, allocating, and caching contents of a hard disk drive block on a solid state drive cache in a memory system, without requiring an inode context. The method includes: identifying one or more HDD blocks for caching by a storage server; assigning a physical block number to each identified HDD block; linking the identified HDD blocks to one another; allocating an SSD physical block number for each linked HDD block; and storing the physical block number for each identified HDD block and the physical block number for each corresponding SSD block within a cache map.

20 Claims, 4 Drawing Sheets

SYSTEM AND METHOD TO READ CACHE DATA ON HYBRID AGGREGATES BASED ON PHYSICAL CONTEXT OF THE DATA

CROSS-REFERENCE TO RELATED APPLICATION:

This patent application claims priority of and is a continuation of U.S. patent application Ser. No. 14/831,103 filed on Aug. 20, 2015, the disclosure of which is incorporated herein by reference in its entirety.

TECHNICAL FIELD

The present disclosure relates generally to mass data storage networks and data storage filing systems. More particularly, aspects of this disclosure relate to methods, non-transitory computer readable media, and devices for writing, allocating, and caching contents of a hard disk drive block on a solid state drive cache in a hybrid aggregate, without requiring an inode context.

BACKGROUND

A storage server is a computer system that is used to store and retrieve data on behalf of one or more clients on a network. The data within the storage server is typically stored on writable persistent storage media, such as nonvolatile memories and disks. The various types of nonvolatile storage media used by a storage server can have different latencies. In many cases, data is stored on hard disk drives (HDDs), which have a relatively high latency. In HDDs, disk access time includes the disk spin-up time, the seek time, rotational delay, and data transfer time. HDDs generally provide good performance when reading large blocks of data, which is stored sequentially on the physical media. However, HDDs do not perform as well for random accesses because the mechanical components of the device must frequently move to different physical locations on the media.

In other cases, data are stored on solid-state drives (SSDs). SSDs generally have lower latencies than HDDs. SSDs use solid-state memory, such as non-volatile flash memory, to store data. With no moving parts (mechanical delays inherent in the operation of the HDD), SSDs typically provide better performance for random and frequent memory accesses because of the relatively low latency. However, SSDs are generally more expensive than HDDs and sometimes have a shorter operational lifetime due to wear and other degradation. These additional up-front and replacement costs can become significant for data centers, which have many storage servers using many thousands of storage devices.

Hybrid storage aggregates combine the benefits of HDDs and SSDs. SSDs make up part of the hybrid storage aggregate and provide high performance, while relatively inexpensive HDDs make up the remainder of the storage array. Lower latency storage is often used as a cache for the higher latency storage. Copies of the most frequently accessed data are stored in the cache. When a data access is performed, the faster cache may first be checked to determine if the required data are located therein, and, if so, the data may be accessed from the cache. In this manner, the cache reduces overall data access times by reducing the number of times the higher latency devices must be accessed. In some cases, cache space is used for data that is being frequently written (i.e., a write cache). In addition, cache space is used for data that is being frequently read (i.e., read cache).

Some conventionally caching regimes are closely tied to inode and buffer context, which may be problematic. The inode is the starting point for finding the locations of all of the associated data blocks that make up the file. Determining the actual physical location of a block may require working through the inode and one or more levels of indirect blocks. FIG. 1 illustrates two buffer trees, one associated with inode 122A and another associated with inode 122B. Inode 122A points to or references level 1 indirect blocks 124A and 124B. Each of these indirect blocks points to the actual physical storage locations of the data blocks which store the data. HDD array 160 is bypassed when reading this block. The performance of the storage system is improved because the data can be read from data block 183 more quickly than it could be from data block 163. Typically many more data blocks will be included in a read cache. Only one block is illustrated in FIG. 1 for purposes of illustration. None of the data blocks associated with inode 122B are cached in this example.

In some cases, multiple levels of indirect blocks are used. An indirect block may point to another indirect block where the latter indirect block points to the physical storage location of the data. Additional layers of indirect blocks are possible. In this case, there has to be an inode attached to the data before caching, which does not allow for caching random data. The fill patterns of the data blocks illustrated in FIG. 1 are indicative of the content of the data blocks. For example, data block 163 and data block 183 contain identical data. At a previous point in time, data block 163 was determined to be frequently accessed and a copy of data block 163 was created in SSD array 170 (i.e., data block 183). Metadata associated with data block 163 in indirect block 124B was updated such that requests to read data block 163 are pointed to data block 183. This is referred to as "dirtying" the inode. A block is considered "clean" when the newest value of the block has been successfully stored and processed within a storage system and "dirty" when the value of the block in the cache is newer than the copy of the block in the storage system. The event during which dirty data blocks stored in the main buffer cache are written to the storage system is called a consistency point.

Unnecessary dirtying of the inode is done for caching which puts pressure on the consistency point process. Dirtying inodes include tagging inodes to direct to new blocks containing modified data. During the consistency point process, the storage server commits the data blocks to a nonvolatile mass storage facility by compressing the data blocks, encrypting selected data blocks, and storing the compressed and (possibly) encrypted data blocks in the SSD based on the dirtied inode (e.g. copying data block 163 into data block 183). It is not unlikely for the consistency point process to encounter issues because too many inodes are dirtied. Complications arise as a result of two or more different types of dirty types of inodes. In situations where the data is stored in read-only volumes, the inodes are unable to be dirtied. As a result, the hybrid aggregates is not configured to utilize the lower latency storage of SSD to cache read-only data in snapshots, or snap-mirror destinations. In addition, there is a logical context attached with the inode requiring strict adherence to the specific operating system for which it resides. As a result, caching may not be achieved if the operating system's protocol is not configured to dirty an inode. Disclosed, for example, is block based caching as opposed to writing the allocation of SSD cached blocks from an inode or volume file-system context.

Figure 1:
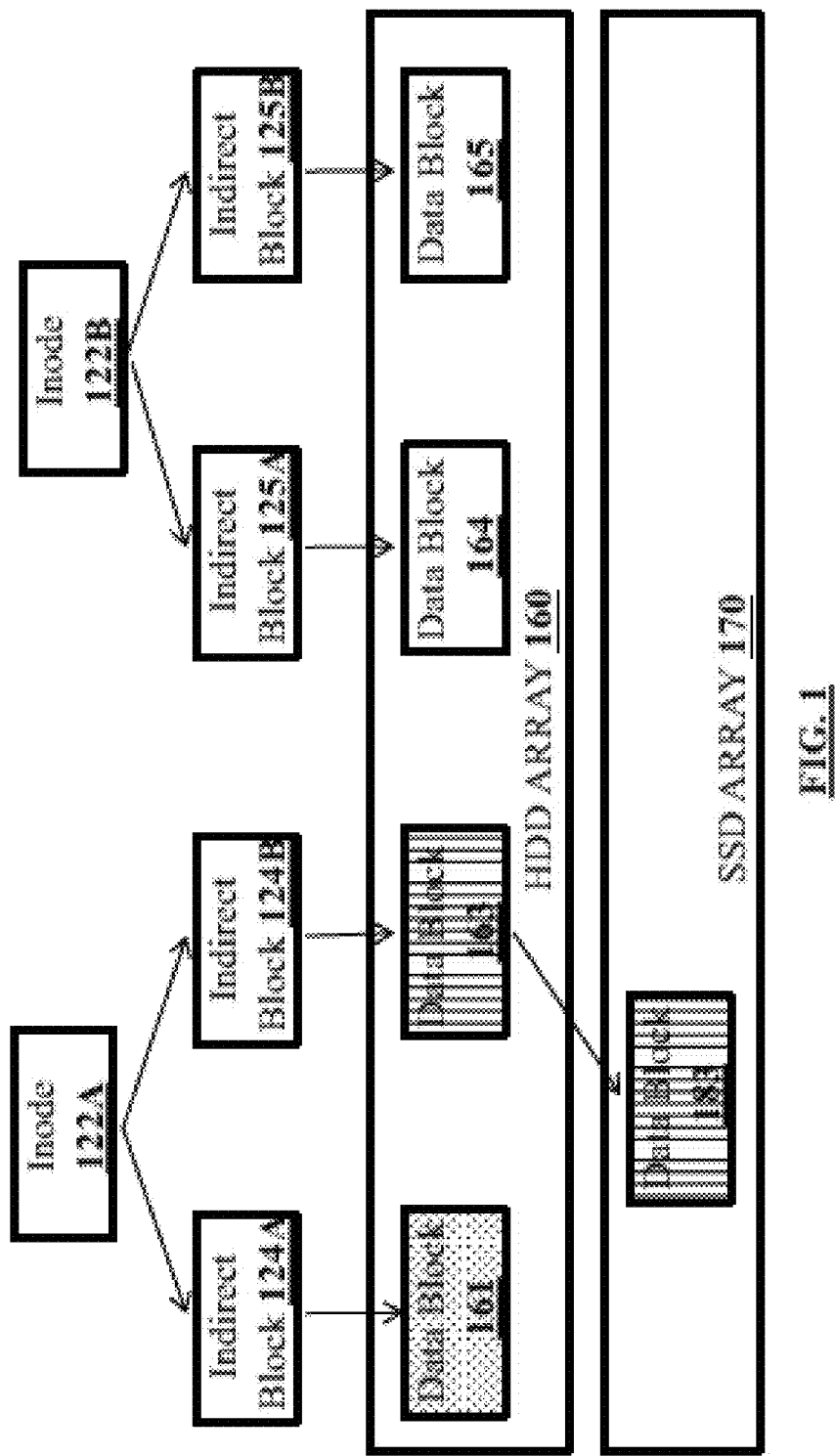
FIG. 1 illustrates an example of read caching in hybrid storage aggregate.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for writing, allocating, and caching contents of a hard disk drive block on a solid state drive cache in a hybrid aggregate, without requiring an inode context. As used herein, the term "storage operating system" generally refers to the computer-executable code operable on a computer to perform a storage function that manages data access and may, in the case of a storage system, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

For at least some embodiments, a buffer is initially identified as a candidate for caching. Instead of dirtying the buffer/inode, the 4K contents of a page buffer are locked in a multiprocessor-safe (mp-safe) fashion. A page is an individually writable unit. A typical page (minimum writable unit) may be 4 kB. This page is then queued in a tracking list for each hybrid aggregate. Once a sufficient number of locked pages are grouped within a batch, the locked pages are assigned a physical block number. As a result, the original buffer, inode or even the virtual file volume (flexvol) can be altered or disposed of without interfering with this caching logic. A virtual file volume contains data in the form of one or more files, directories, subdirectories, logical units (LUNs), or other types of logical containers. This allocation of SSD physical block numbers for these locked pages does not rely on the consistency point process. In fact, upon grouping the locked pages within a batch, the SSD physical block numbers can be allocated before the consistency point process, easing the load of the consistency point process and enabling the system to utilize its non-volatile log (nvlog) space more efficiently. This is because the nvlog space for these 4 k locked pages is reclaimed as soon as the SSD physical block number is assigned to them. In conclusion, not tying caching with the logical context of a page removes the restriction of caching only active filesystem data. Embodiments according to the present disclosure enable read caching any data without the limitations of it being located in snapshot, snapmirror destinations or other conditions where read caching was previously unavailable.

Figure 2:
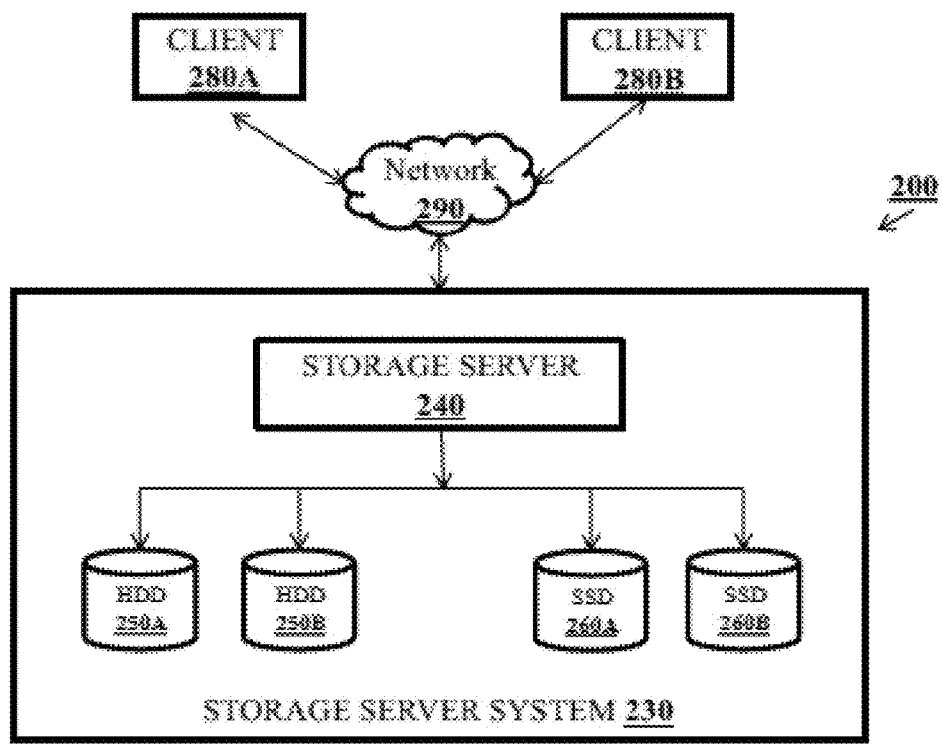
FIG. 2 illustrates an operating environment in accordance with aspects of the present disclosure.

Referring now to the drawings, wherein like reference numerals refer to like features throughout the several views, there is shown in FIG. 2 a representative mass data storage system, designated generally at 200, operable to write, allocate, and cache contents of a hard disk drive block on a solid state drive cache in a hybrid aggregate in accordance with aspects of the present disclosure. The system 200 includes, but is not limited to, a storage server system 230, clients 280A and 280B, and network 290. The network 290 may be, for example, a local area network (LAN), a wireless local area network (WLAN), a wide area network (WAN), a metropolitan area network (MAN), a global area network, a distributed computer system, such as the Internet, a Fibre Channel fabric, or any combination of such interconnects. Each of the clients 280A and 280B may take on various forms including, as some non-limiting examples, a server-class computer, a networked workstation, a personal computer (PC), a handheld computing device, and the like. It should be readily understood that the system 200 illustrated in FIG. 2 is merely provided as an exemplary management by which the various inventive aspects and features of this disclosure can be applied. Moreover, only selected components of the system 200 have been shown and will be described in additional detail herein below. Nevertheless, the systems and devices discussed herein can include numerous additional and alternative features, and other well-known peripheral components, for example, for carrying out the various methods and functions disclosed herein.

The storage server system 230 may include a storage server 240, HDD 250A, HDD 250B, SSD 260A, and SSD 260B. The storage server system 230 may also include other devices or storage components of different types which are used to manage, contain, or provide access to data or data storage resources. The storage server 240 is a computing device that includes a storage operating system that implements one or more file systems. Storage server 240 may be a server-class computer that provides storage services relating to the organization of information on writable, persistent storage media such as HDD 250A, HDD 250B, SSD 260A, and SSD 260B. HDD 250A and HDD 250B are hard disk drives, while SSD 260A and SSD 260B are solid state drives (SSD).

A typical storage server system can include many more HDDs and/or SSDs than are illustrated in FIG. 2. It should be understood that storage server system 230 may be also implemented using other types of persistent storage devices in place of, or in combination with, the HDDs and SSDs. These other types of persistent storage devices may include, for example, flash memory, NVRAM, MEMs storage devices, or a combination thereof. Storage server system 230 may also include other devices, including a storage controller, for accessing and managing the persistent storage devices. Storage server system 230 is illustrated as a monolithic system, but could include systems or devices which are distributed among various geographic locations. Storage server system 230 may also include additional storage servers which operate using storage operating systems which are the same or different from storage server 240.

Storage server 240 manages data stored in HDD 250A, HDD 250B, SSD 260A, and SSD 260B. Storage server 240 also provides access to the data stored in these devices to clients such as client 280A and client 280B. According to the techniques described herein, storage server 240 also writes, allocates, and caches content of HDD 250A and HDD 250B on to SSD 260A and SSD 260B. The teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements.

Figure 3:
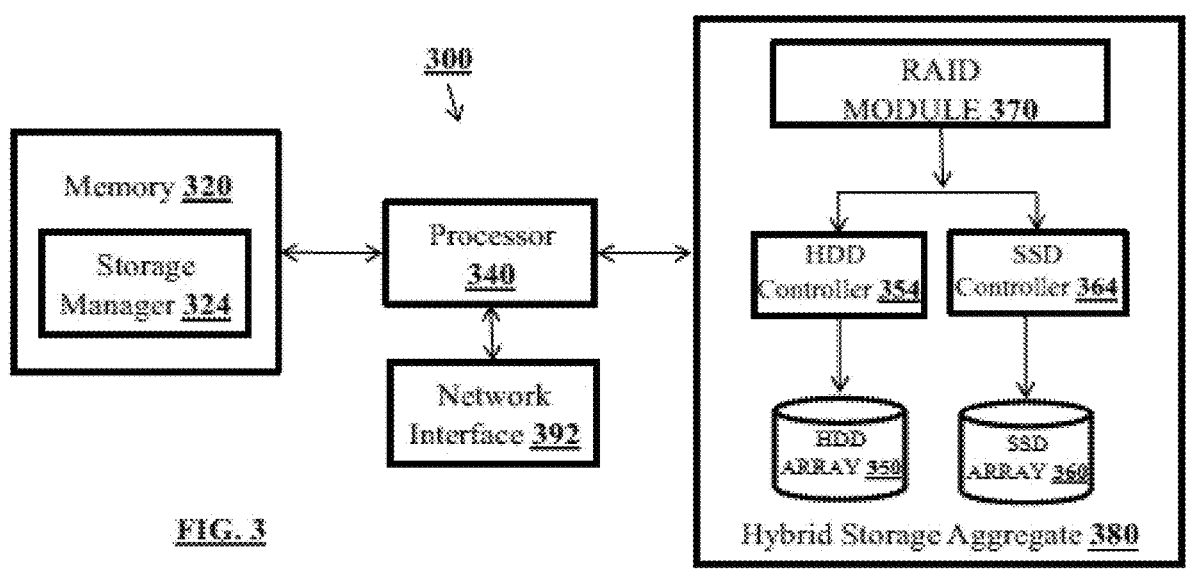
FIG. 3 illustrates an operating environment in accordance with aspects of the present disclosure.

FIG. 3 illustrates storage server system 300 in which some embodiments of the techniques introduced here may also be utilized. Storage server system 300 includes memory 320, processor 340, network interface 392, and hybrid storage aggregate 380. Hybrid storage aggregate 380 includes HDD array 350, HDD controller 354, SSD array 360, SSD controller 364, and RAID module 370. HDD array 350 and SSD array 360 are heterogeneous tiers of persistent storage media. HDD array 350 includes relatively inexpensive, higher latency magnetic storage media devices constructed using disks and read/write heads which are mechanically moved to different locations on the disks. HDD 250A and HDD 250B are examples of the devices which make up HDD array 350. SSD array 360 includes relatively expensive, a lower latency electronic storage media constructed using an array of non-volatile, flash memory devices. SSD 260A and SSD 260B are examples of the devices which make up SSD array 360. Hybrid storage aggregate 380 may also include other types of storage media of differing latencies. The embodiments described herein are not limited to the HDD/SSD configuration and are not limited to implementations which have only two tiers of persistent storage media. Hybrid storage aggregates including three or more tiers of storage are possible. In these implementations, each tier may be operated as a cache for another tier in a hierarchical fashion.

RAID module 370 organizes the HDDs and SSDs within a particular volume as one or more parity groups (e.g., RAID groups) and manages placement of data on the HDDs and SSDs. HDD controller 354 and SSD controller 364 perform low level management of the data which is distributed across multiple physical devices in their respective arrays. RAID module 370 uses HDD controller 354 and SSD controller 364 to respond to requests for access to data in HDD array 350 and SSD array 360. Memory 320 includes storage locations that are addressable by processor 340 for storing software programs and data structures to carry out the techniques described herein. Processor 340 includes circuitry configured to execute the software programs and manipulate the data structures. Storage manager 324 is one example of this type of software program. Storage manager 324 directs processor 340 to, among other things, implement one or more file systems. Processor 340 is also interconnected to network interface 392. Network interface 392 enables devices or systems, such as client 280A and client 280B, to read data from or write data to hybrid storage aggregate 380.

In one embodiment, storage manager 324 implements data placement or data layout processes that improve read and write performance in a hybrid storage aggregate 380. The data blocks in SSD array 360 are assigned for use in storing data. The blocks may be used as a read cache, as a write cache, or for other purposes. Generally, one objective is to use the blocks of SSD array 360 to store the data of hybrid storage aggregate 380 which is most frequently accessed.

Figure 4:
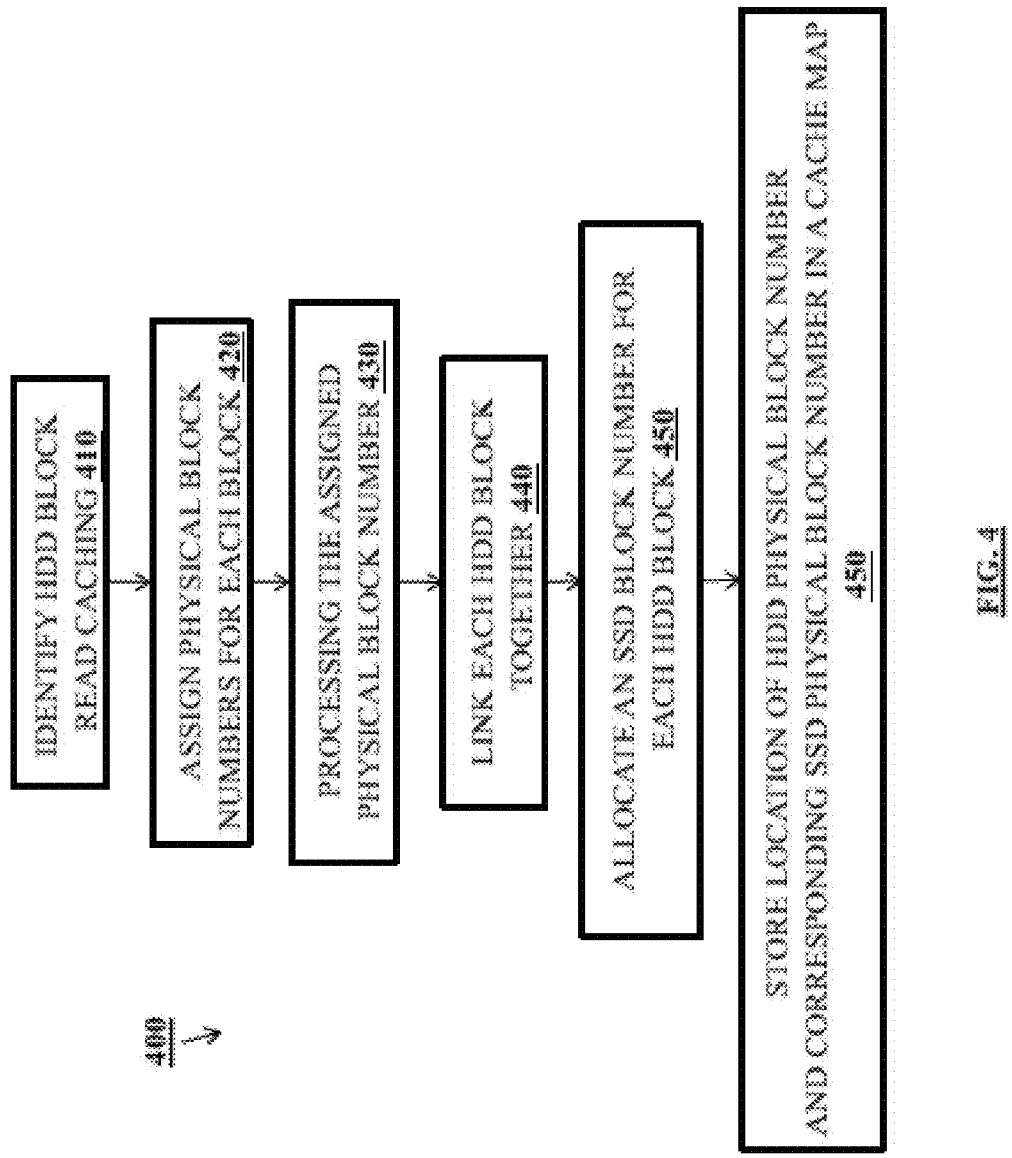
FIG. 4 illustrates an example of a method of operating a hybrid storage aggregate in accordance with aspects of the present disclosure.

FIG. 4 illustrates a method 400 for writing, allocating, and caching contents of the HDD array 350 on the SSD array 360 in a hybrid storage aggregate such as hybrid storage aggregate 380. Method 400 is described here with respect to storage system 300 of FIG. 3, but method 400 could be implemented in many other systems. In step 410, a data block is initially identified as a good candidate for read caching. The data block is a good candidate to copy and create in a lower latency storage tier (originally stored in the higher latency tier) when it is being read frequently. In other cases a block in the high latency tier may be read cached because it is frequently read randomly. A significant performance benefit may be achieved by relocating a data block that is randomly accessed to a lower latency tier, even though the block may not be accessed frequently enough to otherwise qualify it as hot data. Consequently, the frequency of access and nature of the access (i.e., whether the accesses are random) may be jointly considered in determining which data should be located to a lower latency tier. Other criteria may also be used.

The blocks are typically dirtied, wherein the information about the locations of data blocks of files stored in hybrid storage aggregate can be arranged in the form of a buffer tree. A buffer tree includes an inode and one or more levels of indirect blocks that contain pointers that reference lower-level indirect blocks and/or the direct blocks where the data are stored. An inode may also store metadata about the file, such as ownership of the file, access permissions for the file, file size, file type, in addition to the pointers to the direct and indirect blocks. These blocks of data may be spread across many different physical and logical locations or regions of the storage arrays and are typically moved to other locations. Determining the actual physical location of a block may require working through the inode and one or more levels of indirect blocks. However, in this embodiment (step 420), physical block numbers are assigned to each block. The physical block number of a data block is not associated with the source volume, destination volume, or inodes. As a result, the physical block number can be referenced to identify its location within the hybrid storage aggregate 380, specifically the HDD array 350 or the SSD array 360. To assign physical block numbers to each data block, raw data is required. This includes the content of a page buffer which is locked in a multiprocessor-safe (mp-safe) fashion. This page is then queued in a tracking list for each hybrid aggregate. Once a sufficient number of locked pages are grouped within a batch, the locked pages are assigned a physical block number. As a result, the original buffer, inode or even the flex-vol can be altered or disposed of without interfering with this caching logic. Method 400 also includes reading the file and processing the assigned physical block numbers (step 430). The physical block numbers of each HDD data block are linked together (step 440). Upon linking the HDD data blocks, SSD blocks are allocated for each HDD block to copy and create in a lower latency storage tier (step 450).

The locations of the HDD blocks and the corresponding SSD blocks are stored within a cache map based on the physical block numbers assigned to both (step 460). As a result, when accessing a block of a file in response to servicing a client request, the file system specifies a physical block number location on a particular disk within a RAID group of the physical volume. Moreover, the cache map includes information about whether a valid (up-to-date) copy of each data block (indexed by physical address) is present in the corresponding cache. For each block that has a copy in the cache, additional information about the copy is represented in the cache map, including the location of the copy within the cache and whether the data in that copy is clean or dirty.

Figure 5:
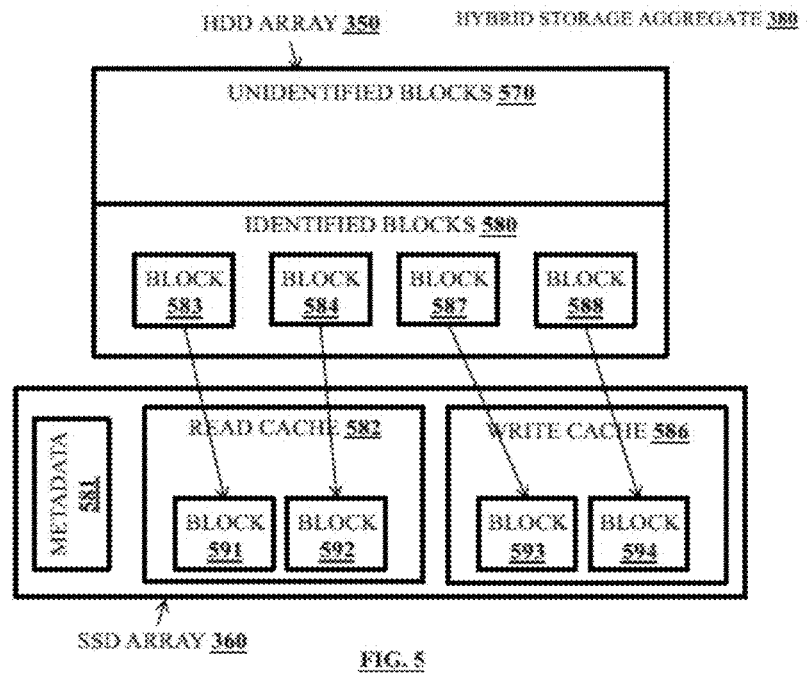
FIG. 5 illustrates an allocation of storage blocks in hybrid storage aggregate in accordance with aspects of the present disclosure.

FIG. 5 illustrates an allocation of storage blocks in hybrid storage aggregate 280. As described previously, hybrid storage aggregate 280 includes HDD array 350 and SSD array 360. The lower latency storage devices of SSD array 360 are operated as a cache for the higher latency storage devices of HDD array 350 in order to improve responsiveness and performance of storage server system 300.

HDD array 350 includes identified blocks 580 and unidentified blocks 570. Identified blocks 580 and unidentified blocks 570 are not physically different or physically separated. They only differ in how they are categorized and used in hybrid storage aggregate 380. Identified blocks 580 have been identified as good candidates for caching based on the usage information, and unidentified blocks 570 have not been identified for caching. This is described in more detail below. In some cases, all of the blocks in SSD array 360 will be identified and unidentified blocks 570 will not include any blocks. In other cases, blocks may be reserved in unidentified blocks 570 to accommodate future system growth or to accommodate periods of peak system usage. Processor 340, in conjunction with storage manager 224, manages the identification and use of identified blocks 580 and unidentified blocks 570.

In the example of FIG. 5, identified blocks 580 of HDD array 350 includes data block 583, data block 584, data block 587, and data block 588. Many more data blocks are typical, but only a small number of blocks is included for purposes of illustration. Although each of the data blocks is illustrated as a monolithic block, the data which makes up each block may be spread across multiple HDDs. The SSD array 360 includes storage of metadata 581 as well as read cache 582 and write cache 586. The SSD array 360 may also be used to store multiple read caches and/or multiple write caches. Metadata 581 includes block usage information describing the usage of data blocks on a per block basis. It should be understood that metadata 581 may also be stored in another location, including HDD array 350.

Read cache 582 and write cache 586 each contain data blocks. Specifically, read cache 582 includes data block 591 and data block 592. Write cache 586 includes data block 593 and data block 594. Read cache 582 and write cache 586 are not physical devices or structures. They illustrate block assignments and logical relationships within the SSD array 360. Specifically, they illustrate how processor 340 and storage manager 324 use data blocks within the SSD array 360 for caching purposes.

In FIG. 5, block 591 of read cache 582 is a read cache for block 583 of HDD array 350. Typically, block 591 is described as a read cache block and block 583 is described as the read cached block. Block 591 contains a copy of the data of block 583. When a request to read block 583 is received by storage server system 300, the request is satisfied by reading block 591. Block 584 and block 592 have a similar read cache relationship. Block 593 is a write cache for block 587 and contains a copy of the data in block 587. At some point in time block 587 and block 588 may have been stored in HDD array 350, but were write cached and the data relocated to write cache 593 and 594, respectively. At a prior point in time, the storage blocks used to store data blocks 583, 584, 587, and 588 was identified for caching. These storage blocks were previously included in unidentified blocks 570 and were put into use thereby logically becoming part of identified blocks 580.

FIG. 5 illustrates an example of a read cache in a hybrid storage aggregate, such as hybrid storage aggregate 380. The processor 340 and storage manager 324 track block usage information of the blocks located in the HDD array 350. The block usage information is included in metadata 581. The block usage information may indicate a type of cache block (i.e., read cache or write cache), a read and/or write frequency of the block, a frequency of which the block is accessed, a lifetime read and/or write total for the block, an owner of the block, a volume the block is identified to, or other usage information. Based on the usage information, the block is identified as a good candidate for caching.

In one example storage manager 324 includes a time and temperature map (TTMap) for each of the identified blocks 580 of HDD array 350. The TTMap may be an entry which includes a block type, a temperature, a pool id, and a reference count. The temperature of the block is a categorical indication of whether or not a block has been accessed more frequently than a preset threshold. For example, a block which has been accessed more than a specified number of times in a designated period may be designated as a "hot" block while a block which has been accessed fewer than the specified number of times in the designated period may be designated as "cold." The block type and the frequency of which the block is accessed are described above. The pool id and the reference count further describe usage of the block. A pool refers to a logical partitioning of the blocks of HDD array 350. A pool may be created for a specific use, such as a write cache, a read cache, a specific volume, a specific file, other specific uses, or combinations thereof. A pool may be dedicated to use as a read cache for a specific volume. A pool may also be allocated for storage of metafiles. The pool ID is the identifier of a pool. In another example, metadata 581 may include a counter map which includes statistics related to various elements of the TTMap. These statistics may include, for example, statistics relating to characteristics of blocks of a particular type, numbers of references to these blocks, temperature of these blocks, or other related information. Metadata 581 may also include an OwnerMap. An OwnerMap includes information about ownership of identified blocks.

The processor 340 and storage manager 324 then assign physical block numbers for each identified block within the HDD array 350. The physical block number of a data block is not associated with the source volume, destination volume, or inodes. In addition, the block number is located on the actual data block and is noted and processed at the processor 340 and storage manager 324. The physical block number identifies the location of the block within the hybrid storage aggregate 380, specifically the HDD array 350. In one example, the metadata 581 are updated in response to an event associated with one of the identified blocks 580. An event may include writing of the block, reading of the block, freeing of the block, or a change in the access frequency of the block. A block may be freed when it is no longer actively being used to store data but has not been unassigned. An event may also include other interactions with a block or operations performed on a block. The metadata 581 is processed to determine usage or caching characteristics of any individual block or combination of blocks of identified blocks 580. The block numbers of the identified blocks remain unchanged, however. The block number for each identified block is unaffected by any event associated with one of the identified blocks 580.

The processor 340 and storage manager 324 may use the block numbers described above to link identified blocks 580 together for allocation. In one example, metadata 581 may be processed in a manner such that the usage or caching characteristics of read cache 582 and write cache 586 are separately identified. Collective usage information for read cache 582 and write cache 586 can be generated by aggregating the block usage information of the individual blocks which make up each of the caches. Processing the aggregated block usage information may indicate which blocks should be linked together for allocation. In another example, the processing of metadata 581 may indicate that all or a majority of the identified blocks are being heavily utilized. In this case, allocation of data blocks to lower latency storage devices of SSD array 360, which operates as a cache for the higher latency storage devices of HDD array 350, can improve responsiveness and performance of hybrid storage aggregate 380.

Figure 6:
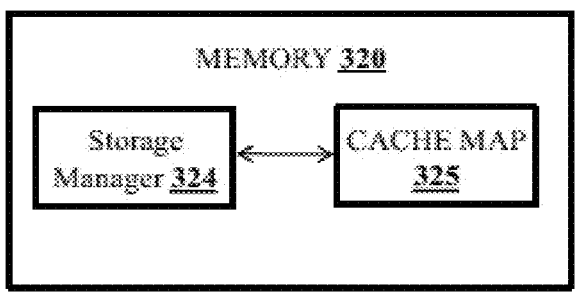
FIG. 6 illustrates a memory in accordance with aspects of the present disclosure.

FIG. 6 illustrates maintenance by memory 320 of several structures, including a storage manager 324 and a cache map 325. The cache map 325 implicitly includes information about whether a valid (up-to-date) copy of each data block, indexed by physical address, is present in the corresponding cache (lower latency storage devices of SSD). For each block that has a copy in the cache, additional information about the copy is represented in the cache map, including the location of the copy within the cache.

Embodiments of the present disclosure include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present disclosure may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting the scope of the disclosure, which is defined by the claims.

What is claimed is:

1. A method comprising:
    identifying a first block stored at a first storage device for caching at a second storage device by a storage server, the first block referenced by an indirect block of a buffer tree;
    assigning a first physical block number to the first block and a second physical block number to a second block indicating the first and second block physical locations at the first storage for linking the first and second block;
    allocating storage blocks at the second storage device to copy the linked first and second block to the second storage device;
    using a cache map to store physical locations of the first and second block at the first and second storage devices, with a status indicator indicating a clean or dirty status for the first and second block; wherein the cache map stores the physical locations independent of indirect blocks of the buffer tree;
    determining a status of the first block from the status indicator, in response to a read request for the first block; and
    accessing the first block from either the first storage device or the second storage device, using the cache map and the status indicator, instead of the buffer tree.

2. The method of claim 1, wherein the first storage device is a hard drive and the second storage device is a solid state drive with lower latency than the hard drive.

3. The method of claim 1, wherein the buffer tree is modified without interfering with the cache map.

4. The method of claim 1, wherein the first block is identified as a candidate for caching at the second storage device based on read frequency.

5. The method of claim 1, wherein the first block is identified as a candidate for caching at the second storage device based on frequency of random read access.

6. The method of claim 1, wherein the first block is identified as a candidate for caching at the second storage device based on frequency of access.

7. The method of claim 1 wherein the first block is identified as a candidate for caching at the second storage device based on access type.

8. The method of claim 1, wherein assigning the first physical block number and the second physical block number comprises:
    locking a page associated with the first and second block;
    queuing the page in a tracking list and grouping the page with a plurality of pages found in a memory system of the storage server; and
    assigning physical block numbers to the locked pages.

9. A non-transitory machine readable storage medium having stored thereon instructions for performing a method, comprising machine executable code which when executed by at least one machine, causes the machine to:
    identify a first block stored at a first storage device for caching at a second storage device by a storage server, the first block referenced by an indirect block of a buffer tree;

assign a first physical block number to the first block and a second physical block number to a second block indicating the first and second block physical locations at the first storage for linking the first and second block;

allocate storage blocks at the second storage device to copy the linked first and second block to the second storage device;

use a cache map to store physical locations of the first and second block at the first and second storage devices, with a status indicator indicating a clean or dirty status for the first and second block; wherein the cache map stores the physical locations independent of indirect blocks of the buffer tree;

determine a status of the first block from the status indicator, in response to a read request for the first block; and access the first block from either the first storage device or the second storage device, using the cache map and the status indicator, instead of the buffer tree.

10. The non-transitory machine readable storage medium of claim 9, wherein the first storage device is a hard drive and the second storage device is a solid state drive with lower latency than the hard drive.

11. The non-transitory machine readable storage medium of claim 9, wherein the buffer tree is modified without interfering with the cache map.

12. The non-transitory machine readable storage medium of claim 9, wherein the first block is identified as a candidate for caching at the second storage device based on read frequency.

13. The non-transitory machine readable storage medium of claim 9, wherein the first block is identified as a candidate for caching at the second storage device based on frequency of random read access.

14. The non-transitory machine readable storage medium of claim 9, wherein the first block is identified as a candidate for caching at the second storage device based on frequency of access.

15. The non-transitory machine readable storage medium of claim 9, wherein the first block is identified as a candidate for caching at the second storage device based on access type.

16. The non-transitory machine readable storage medium of claim 9, wherein assign the first physical block number and the second physical block number comprises:

locking a page associated with the first and second block;

queuing the page in a tracking list and grouping the page with a plurality of pages found in a memory system of the storage server; and assigning physical block numbers to the locked pages.

17. A system, comprising:

a memory containing machine readable medium comprising machine executable code having stored thereon instructions; and a processor module coupled to the memory, the processor module configured to execute the machine executable code to:

identify a first block stored at a first storage device for caching at a second storage device by a storage server, the first block referenced by an indirect block of a buffer tree;

assign a first physical block number to the first block and a second physical block number to a second block indicating the first and second block physical locations at the first storage for linking the first and second block;

allocate storage blocks at the second storage device to copy the linked first and second block to the second storage device;

use a cache map to store physical locations of the first and second block at the first and second storage devices, with a status indicator indicating a clean or dirty status for the first and second block; wherein the cache map stores the physical locations independent of indirect blocks of the buffer tree;

determine a status of the first block from the status indicator, in response to a read request for the first block; and access the first block from either the first storage device or the second storage device, using the cache map and the status indicator, instead of the buffer tree.

18. The system of claim 17, wherein the first block is identified as a candidate for caching at the second storage device based on read frequency.

19. The system of claim 17, wherein the first block is identified as a candidate for caching at the second storage device based on frequency of random read access.

20. The system of claim 17, wherein the first block is identified as a candidate for caching at the second storage device based on frequency of access.

* * * * *